Dec. 18, 1923.
W. T. SEARS
1,477,598
SAFETY DEVICE FOR RADIAL DRILLS
Filed Dec. 29, 1922    2 Sheets-Sheet 1
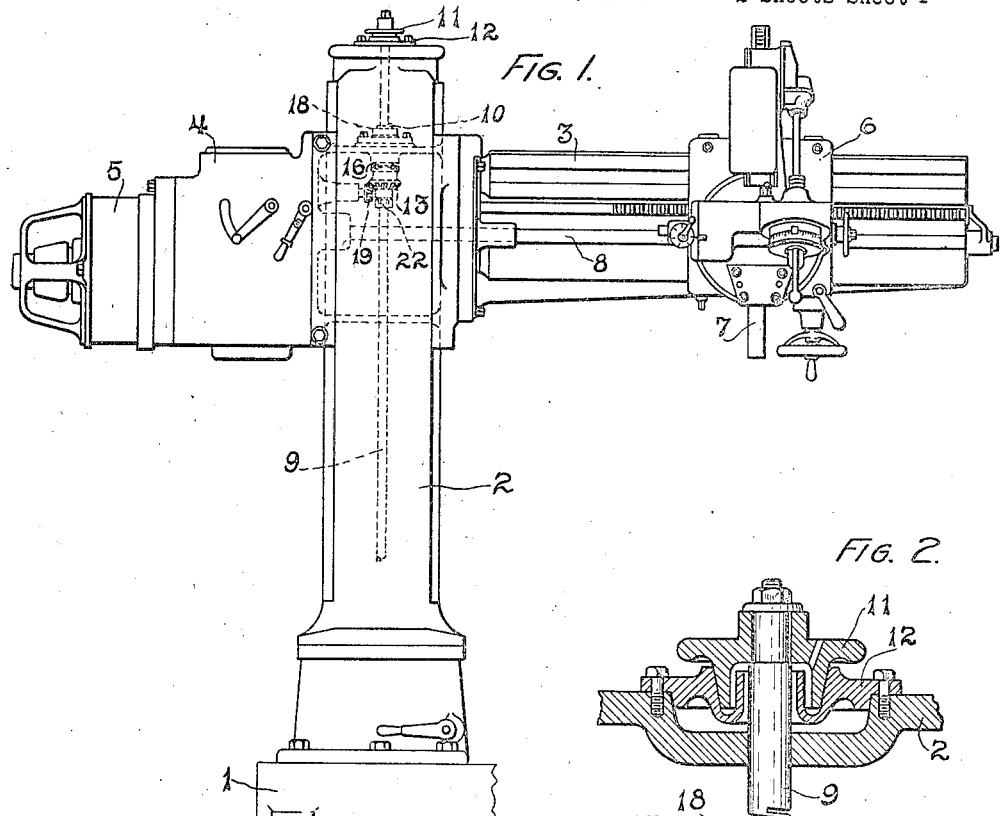
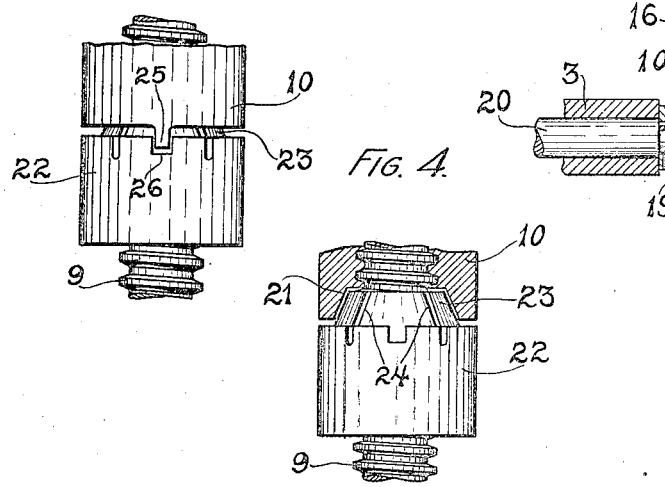
INVENTOR
W. T. Sears
BY
ATTORNEY Dec. 18, 1923.
W. T. SEARS
1,477,598
SAFETY DEVICE FOR RADIAL DRILLS
Filed Dec. 29, 1922      2 Sheets-Sheet 2
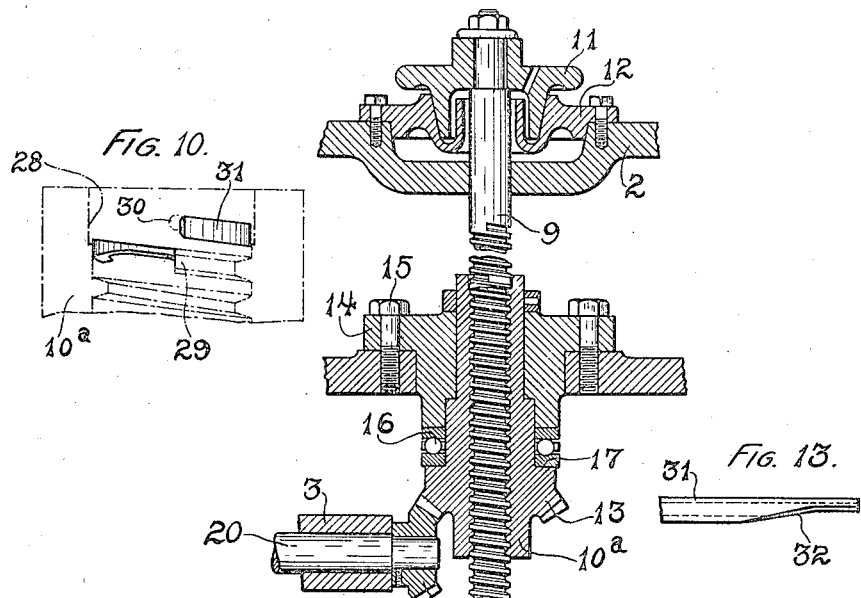
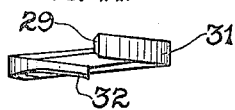
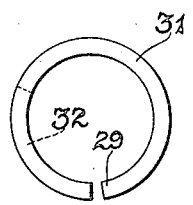
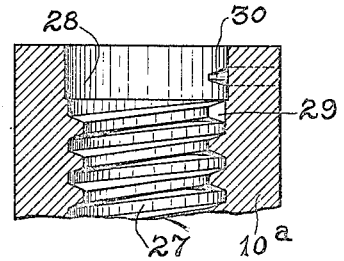
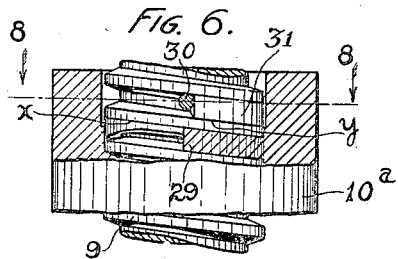
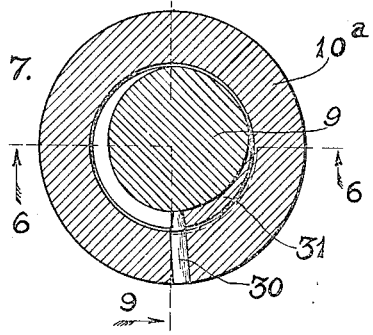
INVENTOR
W. T. Sears
BY
ATTORNEY Patented Dec. 18, 1923.                                                              1,477,598

UNITED STATES PATENT OFFICE.

WILLARD T. SEARS, OF MONTCLAIR, NEW JERSEY, ASSIGNOR TO NILES-BEMENT-POND COMPANY, OF NEW YORK, N. Y., A CORPORATION OF NEW JERSEY.

SAFETY DEVICE FOR RADIAL DRILLS.

Application filed December 29, 1922. Serial No. 609,704.

*To all whom it may concern:*

Be it known that I, WILLARD T. SEARS, a citizen of the United States, residing at Montclair, in the county of Essex and State of New Jersey, have invented certain new and useful Improvements in Safety Devices for Radial Drills, of which the following is a specification.

This invention relates particularly to radial drilling machines, as shown in the accompanying drawings, it being understood however that the scope of the invention is not to be limited by such illustration except as may be defined in the claims appended to this specification. In such machines there is provided a column on which a drill spindle supporting arm is mounted for vertical movement, such movement of the arm on the column usually being performed by a relatively rotatable nut and screw. The weight of the arm is considerable for which reason the threads of the nut frequently become worn to a dangerous degree. This invention relates particularly to means for notifying the operator of such condition in order that he may replace the worn nut with a new nut and furthermore for preventing the use of the nut and screw to elevate the arm until the nut is replaced. The primary object of the invention is to provide improved means for performing such function.

In the drawings I have illustrated the screw as frictionally mounted on the column normally against rotation and the nut as rotatably mounted in the arm and threadedly engaging the screw. Means connected to the nut for rotation therewith and in threaded engagement with the screw is provided for causing a frictional connection between the nut and screw when the threads of the nut become worn a predetermined amount. Such means is adapted to overcome the frictional resistance of the screw and cause the latter to rotate with the nut whereby the arm may not be further elevated when the nut has become worn to a dangerous degree. Another object of the invention is to provide an improved mechanism of the type stated in combination with such a normally frictionally held screw.

A further object of the invention is to provide means, as a special form of split washer, whereby the nut will become non-rotatably gripped to the screw when the threads of the nut become worn to a definite predetermined degree, the said means however being in normal screw threaded engagement with the screw until the nut threads become worn to the said definite degree.

Another object of the invention is to provide means of the type stated, which is adapted to become operative when the nut threads become worn to a predetermined amount, to prevent relative rotation of the nut and screw in a direction to elevate the arm of the radial drill illustrated, such means however not preventing a relative rotation of such elements in a direction to lower the arm.

With the above and other objects in view, my invention consists in the features of construction and operation set forth in the following specification and illustrated in the accompanying drawings. In such drawings annexed hereto and forming a part of this specification, I have shown certain embodiments of my invention applied to a radial drill but it will be understood that the invention can be otherwise embodied and that the drawings are not to be construed as defining or limiting the scope of the invention, the claims appended to this specification being relied upon for that purpose.

Referring to the figures of the drawings, Figure 1 is a front elevation of a radial drill embodying one form of my invention.

Fig. 2 is an enlarged fragmentary sectional view through the column and arm shown in Fig. 1.

Fig. 3 is an enlarged fragmentary side elevation of the screw and nut.

Fig. 4 is a view similar to Fig. 3 but showing the main nut in section.

Fig. 5 is a view similar to Fig. 2 but showing a modified form of the invention.

Fig. 6 is a fragmentary side elevation of the nut shown in Fig. 5, this view being shown partially in section on line 6—6 of Fig. 8.

Fig. 7 is a view similar to Fig. 6 but showing the nut with its thread worn to a dangerous degree.

Fig. 8 is a cross section through the nut and screw taken on line 8—8 of Fig. 6.

Fig. 9 is a fragmentary longitudinal sectional view through the nut.

Fig. 10 is a side view of a lock washer used in connection with the nut, the nut being shown in dot and dash lines cooperating therewith.

Fig. 11 is a side elevation of the lock washer alone.

Fig. 12 is a plan view of the lock washer.

Fig. 13 is a development of one end of the lock washer.

Referring more specifically to the drawings by reference characters, 1 indicates the base, 2 the column and 3 the vertically adjustable arm of a radial drilling machine. The column 2 is preferably divided and the arm 3 or a carrying member therefor extends between the two parts of the column and is suitably guided therein for vertical movement. Rigidly mounted at the rear end of the arm is a gear casing 4 which carries an electric motor 5. Slidably mounted on the other end of the arm is a saddle 6 carrying a head provided with a rotatable drill spindle 7. Means including a driving shaft 8 extending longitudinally of the arm is provided for driving the spindle from the motor 5. The mechanism as thus far described within itself comprises no part of my invention, the same being a standard type of radial drilling machine which is more specifically illustrated and described in my Patent No. 1,296,863.

For adjusting the arm and connected parts vertically, there is provided a vertical screw 9 and a nut 10 and means for rotating one of them relatively to the other. As illustrated, the screw is normally fixed against rotation and the nut is rotated preferably by power derived from the motor 5. The screw is frictionally supported at its upper end in the column by means of frictionally engaged elements 11 and 12 as specifically described in my above cited patent. The nut 10, which is sleeve-like in form, has a bevel gear 13 at its lower end and extends upwardly through a block 14 secured in the arm 3 by means of bolts 15. The weight of the arm is carried on a ball bearing 16 resting on a shoulder 17 of the nut. It will be noted that the nut extends entirely through the block 14 and is provided with a collar 18 secured thereto above the block. A bevel gear 19 on a shaft 20 rotated from the motor 5, as specifically disclosed in my above cited patent, meshes with the bevel gear 13 whereby the nut may be rotated to move the arm vertically.

It will be noted that the entire weight of the arm is supported by the nut 10 for which reason the threads of the nut frequently wear away to a dangerous degree. The improved means comprising the subject matter of this invention whereby the operator is notified of this condition of the nut in order that he may replace the same with a new nut will now be specifically described.

The form of my invention shown in Figs. 1 to 4 of the drawings will first be described. It will be noted that the lower end of the nut 10 is recessed at 21 to the shape of a truncated cone. A second nut 22 is threaded to the screw and provided with a collet portion 23 slotted longitudinally at 24 and fitting within the recess 21. Interengaging lugs and recesses 25 and 26 connect the nuts whereby the nut 22 is rotated from the main nut 10. It will be understood that the main nut 10 normally carries the weight of the arm 3, the nut 22 riding freely on the screw, whereby the latter nut is subject to very little wear.

As the threads of the main nut 10 wear, such nut settles downwardly on the nut 22 and forces the split collet portion 23 into frictional engagement with the screw. Such action causes the nut 23 to grip the screw and, the two nuts being connected by the lugs 25 and the screw being only frictionally held at 11 and 12, the screw will turn with the nuts and therefore be ineffective to further move the arm on the column. When such action takes place, the operator will be warned that the nut is worn and must be replaced with a new nut before the mechanism can be further operated.

Except for the nut and screw locking means, the mechanism shown in Fig. 5 of the drawings is the same as that shown in Fig. 2 and just described. The nut 10$^a$ is threaded at 27 and these threads are cut away at the upper end of the nut to form a counterbore therein at 28. The upper end of the nut thread is cut off squarely at 29. A radially extending pin 30 is seated in the nut just above this end of the thread, the inner end of the pin being tapered to the configuration of the screw thread to be engaged thereby.

A split lock washer 31 is adapted to fit in this end of the nut as illustrated. One end of the washer is cut away at 32 to provide at wedge-like inclined surface and the washer is formed to fit the threads of the screw 9 and to resiliently bear on the screw thread surfaces at $x$ and $y$. In the normal assembled position shown in Figs. 6 and 10, the cut away end of the washer abuts against the end 29 of the nut thread. The other end of the washer is engaged by the pin 30.

In the normal position illustrated in Fig. 6, it will be noted that the washer 31 is freely carried around by the nut as the same is rotated on the screw. As the nut thread wears, due to the weight of the arm 3, the nut settles downwardly relative to the washer on which there is practically no wear. When the nut thread becomes worn sufficiently thin to permit the end 29 to slide past the cut away end 32 of the washer, as illustrated in Fig. 7, such nut slides under the wedge-like surface 32 of the washer and binds the nut thread and washer to the screw between the two adjacent thread convolutions thereof. Further rotation of the nut on the screw in such direction is therefore prevented, the screw being forced to rotate with the nut.

It will be noted (Fig. 7) that the washer prevents rotation of the nut on the screw in a direction to elevate the arm 3 when the nut thread has become worn to a predetermined degree, such degree depending upon the amount of washer cut away at 32. The washer, however, does not prevent rotation of the nut on the screw in a direction to lower the arm. By such arrangement, the operator is warned when the nut is worn to a dangerous degree and the mechanism cannot function to further elevate the arm but may be used to lower the arm to a position permitting a replacement of the nut. It will furthermore be noted that in the mechanism just described, the lock washer does not begin to grip the screw nor in any way begin to perform its function until the nut thread has become worn to the amount predetermined by the cut away end 32 of the washer.

What I claim is:

1. In a machine of the class described, the combination of a supporting member, a member movable vertically thereon, means comprising an interengaging nut and screw normally operative to elevate the movable member, the screw being mounted in one member and the nut in the other member, means for normally holding one of the elevating elements against rotation, means for rotating the other element, and means for preventing relative rotation between the nut and screw to elevate the movable member when the threads of the nut have become worn a predetermined amount.

2. In a machine of the class described, the combination of a supporting member, a member movable vertically thereon, means comprising an interengaging nut and screw normally operative to elevate the movable member, the screw being mounted in one member and the nut in the other member, frictionally operative means for normally holding one of the elevating elements against rotation, means for rotating the other element, and means adapted to operatively connect the nut and screw whereby both rotate together in one direction against the action of the friction means when the threads of the nut have become worn a predetermined amount.

3. In a machine of the class described, the combination of a supporting member, a member movable vertically thereon, means comprising an interengaging nut and screw normally operative to elevate the movable member, the screw being mounted in one member and the nut in the other member, means for normally holding the screw against rotation, means for rotating the nut, and means for operatively connecting the nut and screw to prevent rotation of the nut on the screw in one direction when the threads of the nut have become worn a predetermined amount.

4. In a machine of the class described, the combination of a supporting member, a member movable vertically thereon, means comprising an interengaging nut and screw normally operative to elevate the movable member, the screw being mounted in one member and the nut in the other member, frictionally operative means for normally holding the screw against rotation, means for rotating the nut, and means for operatively connecting the nut and screw whereby the screw is rotated with the nut against the action of the friction means when the threads of the nut have become worn a predetermined amount.

5. In a machine of the class described, the combination of a supporting member, a member movable vertically thereon, means comprising an interengaging nut and screw normally operative to elevate the movable member, the screw being mounted in one member and the nut in the other member, means for normally holding one of the elevating elements against rotation, means for rotating the other element, and means for preventing relative rotation between the nut and screw when the threads of the nut have become worn a definite predetermined amount, the last said means beginning to perform its function only when the nut threads have become worn the said definite amount.

6. In a machine of the class described, the combination of a supporting member, a member movable vertically thereon, means comprising an interengaging nut and screw normally operative to elevate the movable member, the screw being mounted in one member and the nut in the other member, means for normally holding one of the elevating elements against rotation, means for rotating the other element, and means adapted to provide a frictional connection between the nut and screw to prevent their relative rotation when the threads of the nut have become worn a definite predetermined amount, the last said means being inoperative to cause any frictional resistance to the said relative rotation until the nut threads have become worn the said definite amount.

7. In a machine of the class described, the combination of a supporting member, a member movable vertically thereon, means comprising an interengaging nut and screw normally operative to elevate the movable member, the screw being mounted in one member and the nut in the other member, means for normally holding one of the elevating elements against rotation, means for rotating the other element, and means normally non-rotative relative to the nut and in threaded engagement with the screw for providing a frictional connection between the nut and screw to prevent their relative rotation when the threads of the nut have become worn a definite predetermined amount, the last said means being inoperative to cause any frictional resistance to the said relative rotation until the nut threads have become worn the said definite amount.

8. In a machine of the class described, the combination of a supporting member, a member movable vertically thereon, means comprising an interengaging nut and screw normally operative to elevate the movable member, the screw being mounted in one member and the nut in the other member, means for normally holding one of the elevating elements against rotation, means for rotating the other element, and means for preventing relative rotation between the nut and screw in a direction to elevate the movable member when the threads of the nut have become worn a predetermined amount, the last said means being inoperative to prevent relative rotation between the nut and screw in a direction to lower the movable member.

9. In a machine of the class described, the combination of a supporting member, a member movable vertically thereon, means comprising an interengaging nut and screw normally operative to elevate the movable member, the screw being mounted in one member and the nut in the other member, means for normally holding one of the elevating elements against rotation, means for rotating the other element, a split washer mounted within the nut and in threaded engagement with the screw, the washer being provided with a wedge surface adapted to cooperate with the threads of the nut and screw to provide a frictional connection therebetween when the threads of the nut have become worn a predetermined amount.

10. In a drilling machine, the combination of a column, an arm movable vertically thereon, a screw supported on the column normally against rotation, a nut normally supporting the arm and threadedly engaging the screw, means for rotating the nut, and means cooperating with the nut and screw to connect such elements whereby the screw rotates with the nut after the nut threads have become worn a predetermined amount.

11. In a drilling machine, the combination of a column, an arm movable vertically thereon, a screw supported on the column normally against rotation, a nut normally supporting the arm and threadedly engaging the screw, means for rotating the nut, and means cooperating with the nut and screw after the nut threads have become worn a predetermined amount to connect such elements whereby the screw rotates with the nut in one direction, the last said means being inoperative to prevent rotation of the nut on the screw in the opposite direction.

12. In a radial drilling machine, the combination of a column, an arm movable vertically thereon, a screw supported on the column and normally frictionally held against rotation, a nut normally supporting the arm and threadedly engaging the screw, means for rotating the nut, and means operatively connected to the nut and threadedly engaging the screw, the last said means being operative upon a predetermined wearing of the nut threads to frictionally connect the nut and screw whereby to cause the screw to turn with the nut against the action of the means normally holding the screw against rotation.

13. In a radial drilling machine, the combination of a column, an arm movable vertically thereon, a screw supported on the column and normally frictionally held against rotation, a nut normally supporting the arm and threadedly engaging the screw, means for rotating the nut, and means mounted in the nut and threadedly engaging the screw, such means being adapted to cooperate with a screw thread engaging portion of the nut to cause a frictional connection between the nut and screw after the nut threads have become worn a predetermined amount, whereby to prevent rotation of the nut on the screw in one direction, the last said means being inoperative to prevent rotation of the nut on the screw in the opposite direction.

14. In a radial drilling machine, the combination of a column, an arm movable vertically thereon, a screw supported on the column and normally frictionally held against rotation, a nut normally supporting the arm and threadedly engaging the screw, means for rotating the nut, and a split washer mounted in the nut and threadedly engaging the screw, one end of the washer being cut away to provide an inclined surface thereon adapted to cooperate with a screw thread engaging portion of the nut to cause a frictional connection between the nut and screw after the nut threads have become worn a predetermined amount.

In testimony whereof, I hereto affix my signature.

WILLARD T. SEARS.